(12) United States Patent
Fukuda (10) Patent No.: US 7,639,316 B2
(45) Date of Patent: Dec. 29, 2009

(54) BEZEL, AND LIQUID CRYSTAL MODULE HAVING A BEZEL

(75) Inventor: Yutaka Fukuda, Daito (JP)

(73) Assignee: Funai Electric Co., Ltd., Osaka (JP)

(*) Notice: Subject to any disclaimer, the term of this patent is extended or adjusted under 35 U.S.C. 154(b) by 576 days.

(21) Appl. No.: 11/471,641

(22) Filed: Jun. 21, 2006

(65) Prior Publication Data

US 2007/0008687 A1 Jan. 11, 2007

(30) Foreign Application Priority Data

Jul. 11, 2005 (JP) .............................. 2005-201254

(51) Int. Cl.
*G02F 1/1333* (2006.01)
*G06F 1/16* (2006.01)
(52) U.S. Cl. .................... 349/58; 361/679.21
(58) Field of Classification Search .............. 349/58; 345/905; 361/681, 679.22, 679.26, 679.27, 361/679.58
See application file for complete search history.

(56) References Cited

U.S. PATENT DOCUMENTS

| 7,236,216 B2* | 6/2007 | Oka .............................. 349/58 |
| 2004/0219857 A1 | 11/2004 | Fujishiro et al. | |
| 2006/0055839 A1* | 3/2006 | Hirao et al. .................... 349/58 |

FOREIGN PATENT DOCUMENTS

| EP | 1 617 280 A3 | 1/2006 |
| JP | H04-073714 | 3/1992 |
| JP | 10-246881 A | 9/1998 |
| JP | 11-133881 | 5/1999 |
| JP | 2000-314872 | 11/2000 |
| JP | 2002-06291 A | 1/2002 |
| JP | 2002-23648 A | 1/2002 |
| JP | 2002-72914 A | 3/2002 |
| JP | 2003-005156 | 1/2003 |
| JP | 2003-195263 A | 7/2003 |
| JP | 2003-344826 A | 12/2003 |
| JP | 2004-163514 A | 6/2004 |
| JP | 2005-114838 A | 4/2005 |

* cited by examiner

*Primary Examiner*—Dung Nguyen
*Assistant Examiner*—Tai Duong
(74) *Attorney, Agent, or Firm*—Global IP Counselors, LLP (57) ABSTRACT

To improve gap consistency at the abutting sites when two members of a bezel that has been divided in two are abutted in a rectangular frame shape, to facilitate the work of binding the two members, and to reduce costs by using as few screw fastening sites as possible. A rectangular frame-shaped bezel A is divided into two (first and second) L-shaped members 5 and 6 at two diagonal corners. Lugs 11 and 12 that form a screw tab 1 are separately and contiguously provided to the division ends of the L-shaped members 5 and 6, and these two lugs 11 and 12 are equipped with a positioning mechanism. The positioning mechanism has a clamping face 13a and engagement tabs 14 and 15. The clamping face 13a is formed by bending the lug 12 at two places in the same direction.

14 Claims, 10 Drawing Sheets

BEZEL, AND LIQUID CRYSTAL MODULE HAVING A BEZEL

CROSS-REFERENCE TO RELATED APPLICATIONS

This application claims priority to Japanese Patent Application No. 2005-201254. The entire disclosure of Japanese Patent Application No. 2005-201254 is hereby incorporated herein by reference.

BACKGROUND OF THE INVENTION

1. Field of the Invention

The present invention relates to a bezel, and more particularly relates to a rectangular frame-shaped bezel that sandwiches a liquid crystal panel between itself and a frame. The present invention also relates to a liquid crystal module having a bezel, and more particularly to a liquid crystal module having a bezel in which this bezel is fastened by screws to a frame by utilizing screw tabs protruding outward from the bezel.

2. Background Information

Measures have been proposed in the past for facilitating joining work by dividing the frame of a liquid crystal display in two and increasing the strength of the abutting components thereof (see, for example, Japanese Laid-Open Patent Application 2003-5156). A liquid crystal panel fixing structure has also been proposed with which a liquid crystal panel can be fixed without taking up too much space (see, for example, Japanese Laid-Open Patent Application H11-133881).

Figure 10:
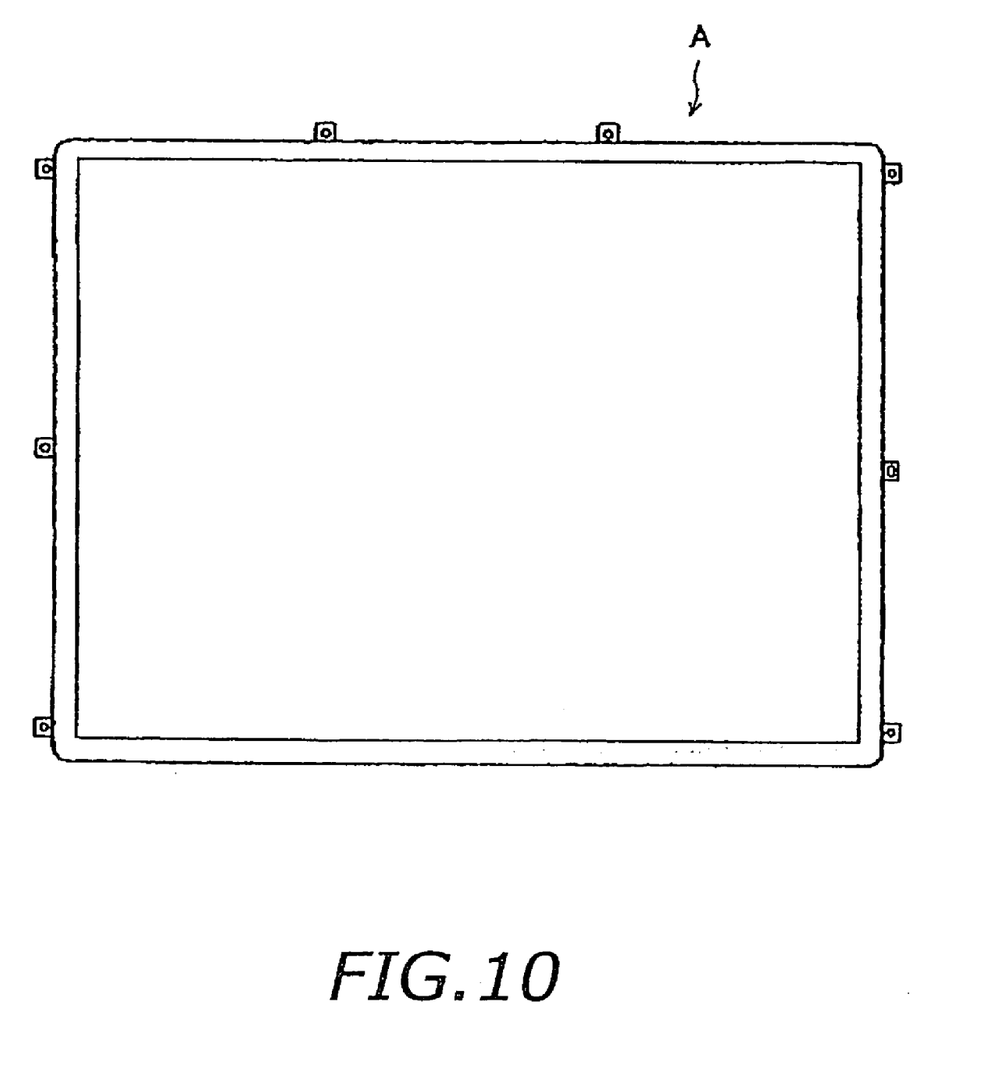
FIG. 10 is a plan view of a bezel formed by being punched out in a rectangular frame shape.

Meanwhile, with liquid crystal modules used in television receivers, a rectangular frame-shaped bezel that is fitted around the outside of the liquid crystal panel is fastened by screws to a frame, so that the liquid crystal panel is attached by being sandwiched between the bezel and the frame. A bezel (A) employed in such a liquid crystal module can be produced in the shape shown in FIG. 10 by being punched out in the shape of a rectangular frame from sheet metal, but this method results in a large amount of material loss on the inside of the punched area, which drives up the cost. What has been done to minimize this material loss is to divide the bezel into two members and punch each of these members out from a piece of sheet metal. This allows a favorable punching pattern to be selected for the two members, thereby minimizing material loss.

Nevertheless, when a bezel is divided into two members, and these two members are abutted and bound in a rectangular frame shape, eliminating variance in the gap width at the abutting sites (ensuring a consistent gap) and facilitating the work of binding the abutting sites are also considered important in terms of keeping costs low, along with minimizing material loss as discussed above.

The present invention was conceived in light of this situation, and it is an object thereof to provide a bezel with which not only can a consistent gap at the abutting sites be achieved when the two members are abutted in a rectangular frame shape, but also the work of binding the two members can be made easier, and furthermore, costs can be reduced by using as few screw fastening sites as possible in fixing this bezel to the frame.

It is another object of the present invention to provide a liquid crystal module that makes use of the above-mentioned bezel.

This invention addresses this need in the art as well as other needs, which will become apparent to those skilled in the art from this disclosure.

SUMMARY OF THE INVENTION

The bezel according to the first aspect of the present invention is a rectangular frame-shaped bezel that is fitted around the outside of a liquid crystal panel and sandwiches the liquid crystal panel between itself and a frame, and in which screw tabs that protrude outward are provided to the corners. The bezel comprises two first and second L-shaped members, lugs, and a positioning mechanism. The two first and second L-shaped members are abutted together at two diagonal corners. The lugs form the screw tabs located at at least one of the two diagonal corners by overlapping one another and are separately and contiguously provided to the mutually abutting division ends of the two L-shaped members. The positioning mechanism that is provided to the overlapped lugs and positions the lugs relative to each other in two perpendicular axial directions.

With this constitution, the two L-shaped members can be punched out of sheet metal in a pattern in which the inside corner of one L-shaped member fits up against the outside corner of the other L-shaped member, so the material loss that occurs in punching can be kept to a minimum. Also, because the screw tabs are formed by lugs formed contiguously at the division ends of the L-shaped members, and these lugs are equipped with a positioning mechanism that positions the lugs relative to each other in two perpendicular axial directions, and since the two lugs are positioned by their positioning mechanisms, the two L-shaped members are positioned with each other and a consistent gap is ensured, and furthermore, since the screw tabs can be fastened by screws in a state in which the two L-shaped members have been positioned, the work of screwing the members together is that much easier.

The bezel according to the second aspect of the present invention is the bezel according to the first aspect of the present invention, in which the positioning mechanism includes a pair of clamping faces and a pair of engagement tabs. The pair of clamping faces are provided to the lug on one side and clamp the lug on the other side from both sides thereof. The pair of engagement tabs are separately provided to both of the lugs and engage with each other in a direction perpendicular to the clamping direction of the lug on the other side by the clamping faces when the lug on the other side is clamped by the pair of clamping faces.

The bezel according to the third aspect of the present invention is the bezel according to the second aspect of the present invention, in which the pair of clamping faces are formed by mutually opposing groove wall faces of groove-shaped components formed by bending the lug on the one side at two places in the same direction.

The bezel according to the fourth aspect of the present invention is the bezel according to the first aspect of the present invention, in which the positioning mechanism includes a latching tab and a latching hole. The latching tab is formed by bending at the distal end of the lug on one side. The latching hole is provided to the lug on the other side and latches the latching tab in a fitted state.

The bezel according to the fifth aspect of the present invention is the bezel according to the first aspect of the present invention, in which the positioning mechanism includes a first positioning mechanism that is located on one corner of the two diagonal corners and a second positioning mechanism that is located on the other corner. The first positioning mechanism includes a pair of clamping faces and a pair of engagement tabs. The pair of clamping faces are provided to the lug on one side and clamp the lug on the other side from both sides thereof. The pair of engagement tabs are separately provided to both of the lugs and engage with each other in a direction perpendicular to the clamping direction of the lug on the other side by the clamping faces when the lug on the other side is clamped by the pair of clamping faces. The second positioning mechanism includes a latching tab and a latching hole. The latching tab is formed by bending at the distal end of the lug on one side. The latching hole is provided to the lug on the other side and latches the latching tab in a fitted state.

The operation of the bezel pertaining to the present invention will be described in detail through reference to the following embodiments.

The liquid crystal module according to the sixth aspect of the present invention is a liquid crystal module having a rectangular frame-shaped bezel. The liquid crystal module comprises a liquid crystal panel, a frame, a rectangular frame-shaped bezel, a first latching means, a second latching means, a centering means, and fastening screws. The liquid crystal panel is placed on the frame. The rectangular frame-shaped bezel is fitted around the outside of the liquid crystal panel, sandwiches the liquid crystal panel between itself and the frame, is equipped with screw tabs that protrude outward and are provided to the corners, and includes two L-shaped members that are abutted together at two diagonal corners. The first latching means fixes the division ends of the two L-shaped members temporarily when the L-shaped members are abutted together in the shape of a rectangular frame to form the bezel. The second latching means fixes the L-shaped members to the frame temporarily The centering means is provided to the frame and positions the bezel with respect to the center of the liquid crystal panel to which the bezel is fitted. The fastening screws fix the screw tabs to the frame.

With this constitution, when the bezel is fastened by screws to the frame, the division ends of the two L-shaped members are temporarily fixed together by the first latching means, and the L-shaped members are first latching means are temporarily fixed to the frame by the second latching means, so is the work entailed by screw fastening made easier, and furthermore, since the bezel is positioned with respect to the center of the liquid crystal panel by the centering means, it is less likely that assembly defects will occur due to the bezel being off-center.

The liquid crystal module having a bezel according to the seventh aspect of the present invention is the liquid crystal module having a bezel according to the sixth aspect of the present invention, in which the first latching means includes lugs and a positioning mechanism. The lugs form the screw tabs located at at least one of the two diagonal corners by overlapping one another and are separately and contiguously provided to the mutually abutting division ends of the two L-shaped members. The positioning mechanism is provided to the overlapped lugs and positions the lugs relative to each other in two perpendicular axial directions. The result of this is that because the two lugs are positioned by the positioning mechanism, the two L-shaped members are positioned with respect to one another and a consistent gap is ensured, and furthermore, since the screw tabs can be fastened by screws in a state in which the two L-shaped members have been positioned, the work of screwing the members together is that much easier, and this effect is achieved by the bezel itself.

The liquid crystal module having a bezel according to the eighth aspect of the present invention is the liquid crystal module having a bezel according to the seventh aspect of the present invention, in which the positioning mechanism includes a pair of clamping faces and a pair of engagement tabs. The pair of clamping faces are provided to the lug on one side and clamp the lug on the other side from both sides thereof. The pair of engagement tabs are separately provided to both of the lugs and engage with each other in a direction perpendicular to the clamping direction of the lug on the other side by the clamping faces when the lug on the other side is clamped by the pair of clamping faces.

The liquid crystal module having a bezel according to the ninth aspect of the present invention is the liquid crystal module having a bezel according to the eighth aspect of the present invention, in which the pair of clamping faces are formed by mutually opposing groove wall faces of groove-shaped components formed by bending the lug on the one side at two places in the same direction.

The liquid crystal module having a bezel according to the tenth aspect of the present invention is the liquid crystal module having a bezel according to the seventh aspect of the present invention, in which the positioning mechanism includes a latching tab and a latching hole. The latching tab is formed by bending at the distal end of the lug on one side. The latching hole is provided to the lug on the other side and latches the latching tab in a fitted state.

The liquid crystal module having a bezel according to the eleventh aspect of the present invention is the liquid crystal module having a bezel according to the seventh aspect of the present invention, in which the positioning mechanism includes a first positioning mechanism that is located on one corner of the two diagonal corners and a second positioning mechanism that is located on the other corner. The first positioning mechanism includes a pair of clamping faces and a pair of engagement tabs. The pair of clamping faces are provided to the lug on one side and clamp the lug on the other side from both sides thereof. The pair of engagement tabs are separately provided to both of the lugs and engage with each other in a direction perpendicular to the clamping direction of the lug on the other side by the clamping faces when the lug on the other side is clamped by the pair of clamping faces. The second positioning mechanism includes a latching tab and a latching hole. The latching tab is formed by bending at the distal end of the lug on one side. The latching hole is provided to the lug on the other side and latches the latching tab in a fitted state.

Again with these inventions, the effect is achieved by the bezel itself as discussed above.

The liquid crystal module having a bezel according to the twelfth aspect of the present invention is the liquid crystal module having a bezel according to the sixth aspect of the present invention, in which the second latching means is formed by engagement protrusions that is provided at a plurality of locations around the frame, and engagement holes that is formed at a plurality of locations in the L-shaped members and is capable of engaging and disengaging the engagement protrusions. This allows the L-shaped members to be temporarily fixed to the frame merely by engaging the engagement protrusions on the frame side in the engagement holes of the L-shaped members. Furthermore, because no separate part is used for the second latching means, this configuration does not increase the number of parts.

The liquid crystal module having a bezel according to the thirteenth aspect of the present invention is the liquid crystal module having a bezel according to the sixth aspect of the present invention, in which the centering means is formed by ribs that are provided to the corners of the frame and position the L-shaped members by coming into contact with the inner faces of the inside corners of the L-shaped members. This allows the L-shaped members to be positioned with respect to the center of the liquid crystal panel without increasing the number of parts.

The liquid crystal module according to the fourteenth aspect of the present invention is a liquid crystal module having a rectangular frame-shaped bezel. The liquid crystal module comprises a liquid crystal panel, a frame, a rectangular frame-shaped bezel, a first latching means, a second latching means, a centering means, fastening screws. The liquid crystal panel is placed on the frame. The rectangular frame-shaped bezel is fitted around the outside of the liquid crystal panel, sandwiches the liquid crystal panel between itself and the frame, is equipped with screw tabs that protrude outward and are provided to each of four corners, and includes two L-shaped members that are abutted together at two diagonal corners. The first latching means fixes the division ends of the two L-shaped members temporarily when the L-shaped members are abutted together in the shape of a rectangular frame to form the bezel. The second latching means fixes the L-shaped members to the frame temporarily, and is formed by engagement protrusions provided at a plurality of locations around the frame and engagement holes formed at a plurality of locations in the L-shaped members and capable of engaging and disengaging the engagement protrusions. The centering means is formed by ribs that are provided to the corners of the frame and position the L-shaped members by coming into contact with the inner faces of the inside corners of the L-shaped members, and positions the bezel with respect to the center of the liquid crystal panel to which the bezel is fitted. The fastening screws fix the screw tabs to the frame. The first latching means includes lugs and a positioning mechanism. The lugs form the screw tabs located at the two diagonal corners by overlapping one another and are separately and contiguously provided to the mutually abutting division ends of the two L-shaped members. The positioning mechanism is provided to the overlapped lugs and positions the lugs relative to each other in two perpendicular axial directions. The positioning mechanism includes a pair of clamping faces and a pair of engagement tabs. The pair of clamping faces are provided to the lug on one side and clamp the lug on the other side from both sides thereof. The pair of engagement tabs are separately provided to both of the lugs and engage with each other in a direction perpendicular to the clamping direction of the lug on the other side by the clamping faces when the lug on the other side is clamped by the pair of clamping faces. The pair of clamping faces are formed by mutually opposing groove wall faces of groove-shaped components formed by bending the lug on the one side at two places in the same direction. The operation of this invention will be described in detail through reference to the following embodiments.

As discussed above, with the bezel pertaining to the present invention, when the bezel is divided into two members, not only is there greater consistency in the gaps at the sites where the two members are abutted together in the form of a rectangular frame, but the work of binding the two members is also easier, and the number of screw fastening sites can be kept to a minimum when the bezel is fixed to a frame, which affords a reduction in cost. Accordingly, not only is assembly work facilitated and mass productivity increased, but a bezel can be provided that is attractive and has consistent gaps.

With the liquid crystal module having a bezel pertaining to the present invention, assembly work is facilitated by making it easier to screw the bezel to the frame, without increasing the number of parts, and it is also less likely that assembly defects will occur due to the bezel being off-center. In addition, the effect of the second latching means and so forth keeps the number of screw fastening sites to a minimum, and this also facilitates assembly work and leads to lower costs.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
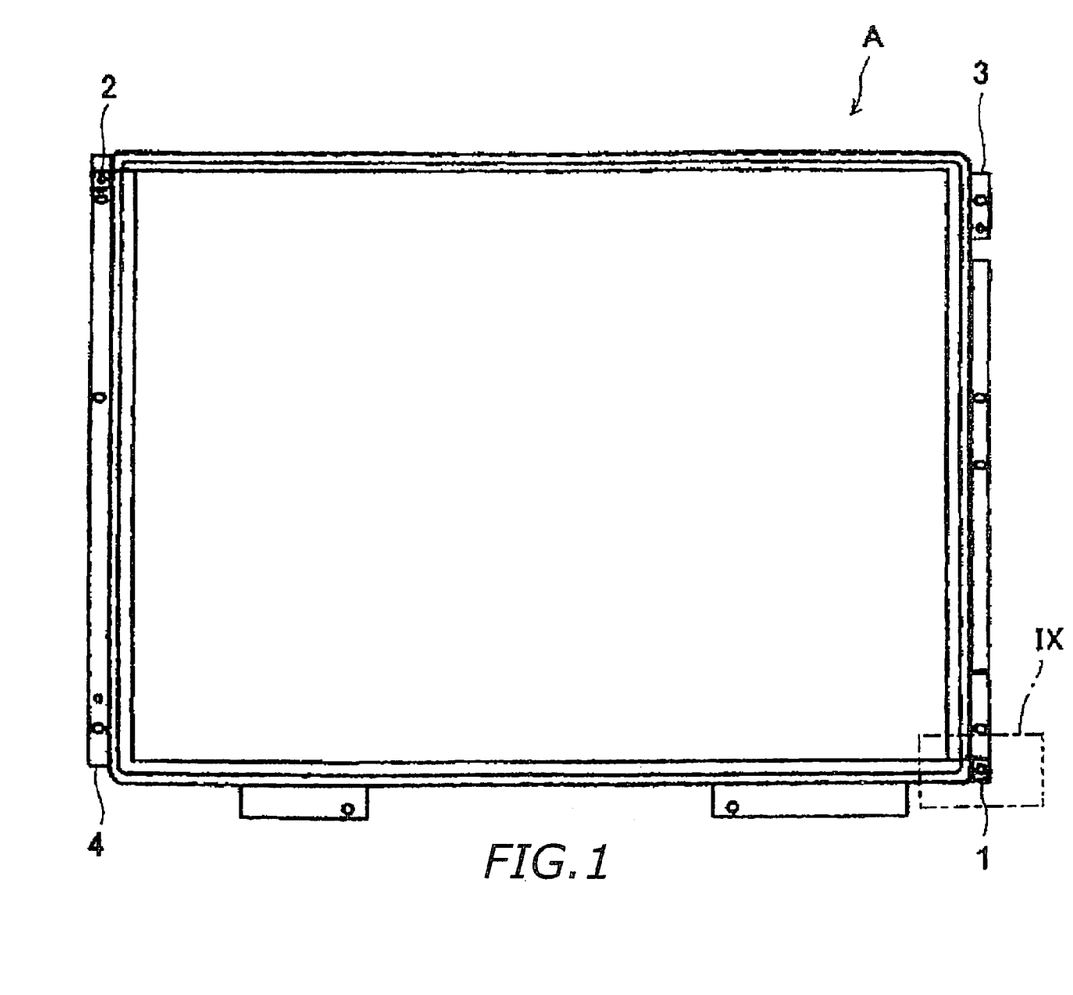
FIG. 1 is a plan view of the assembled state of a bezel A pertaining to an embodiment of the present invention.
Figure 2:
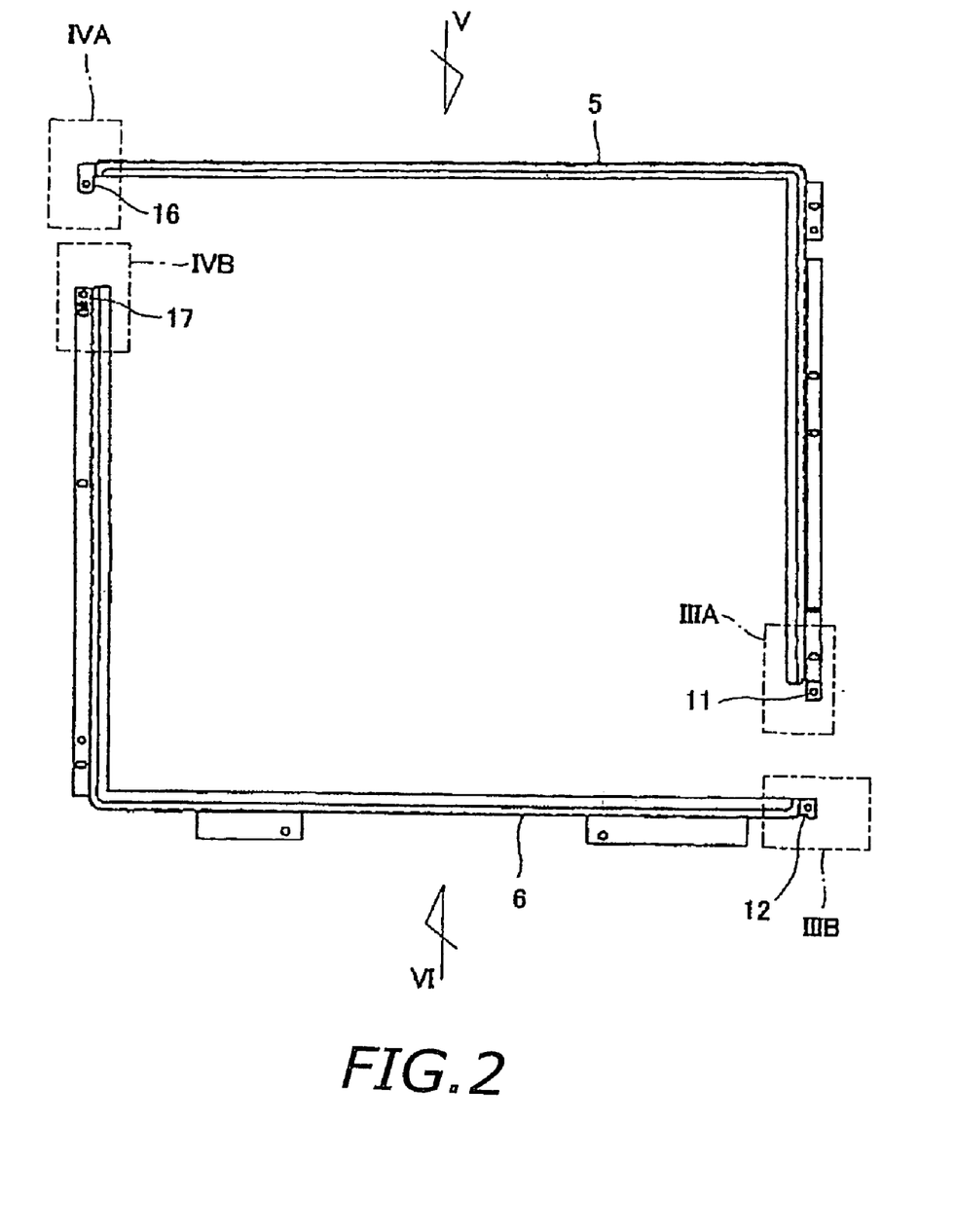
FIG. 2 is a plan view of two L-shaped members.
Figure 3A:
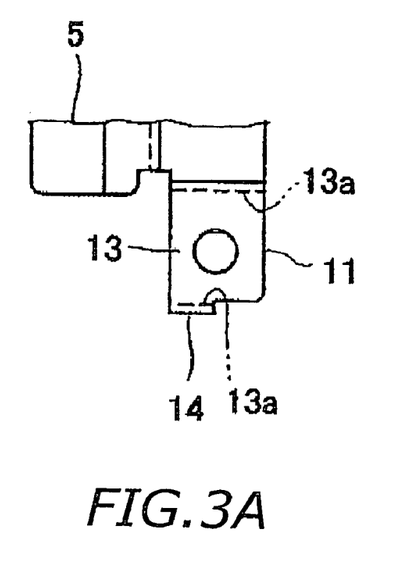
FIG. 3A is a detail view of the IIIA portion in FIG. 2.
Figure 3B:
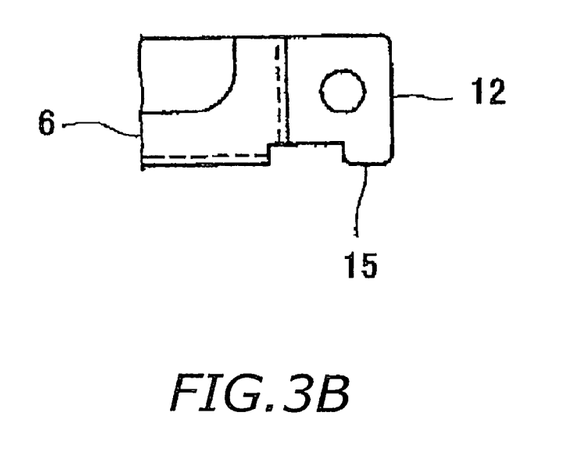
FIG. 3B is a detail view of the IIIB portion in FIG. 2.
Figure 4A:
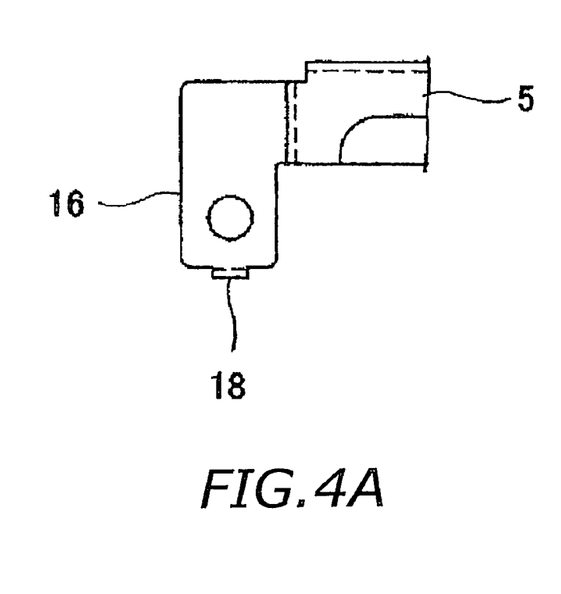
FIG. 4A is a detail view of the IVA portion in FIG. 2.
Figure 4B:
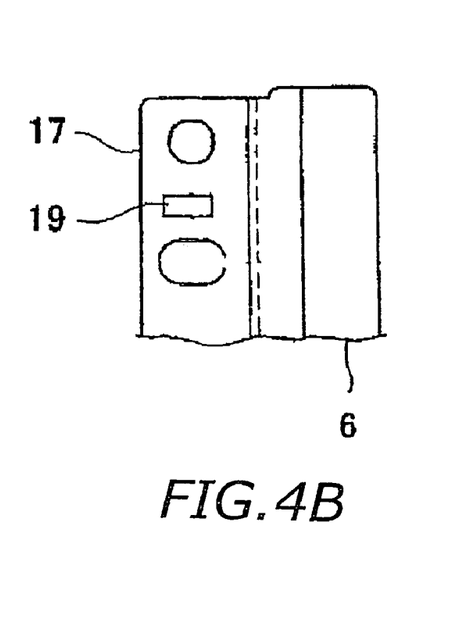
FIG. 4B is a detail view of the IVB portion in FIG. 2.
Figure 5:
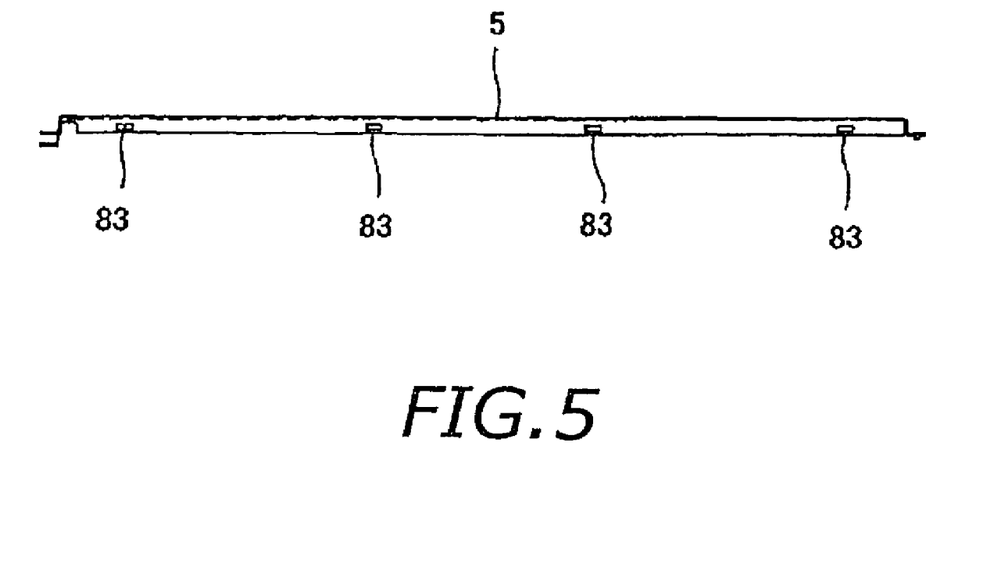
FIG. 5 is a view in the direction of the arrow V in FIG. 2.
Figure 6:
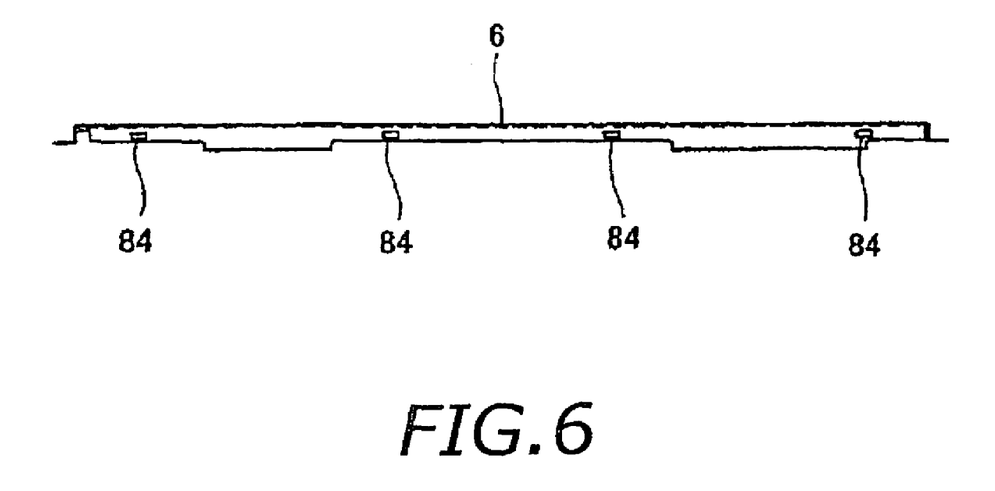
FIG. 6 is a view in the direction of the arrow VI in FIG. 2.
Figure 7:
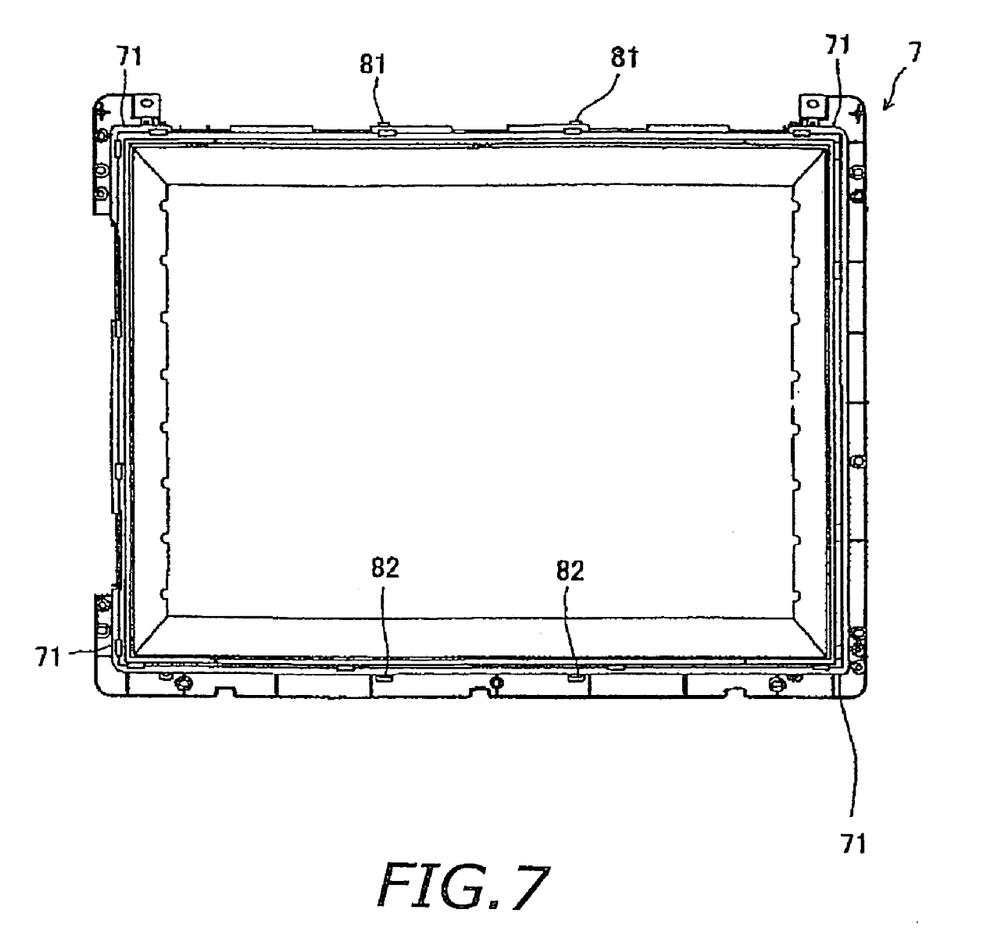
FIG. 7 is a plan view of a frame 7.
Figure 8:
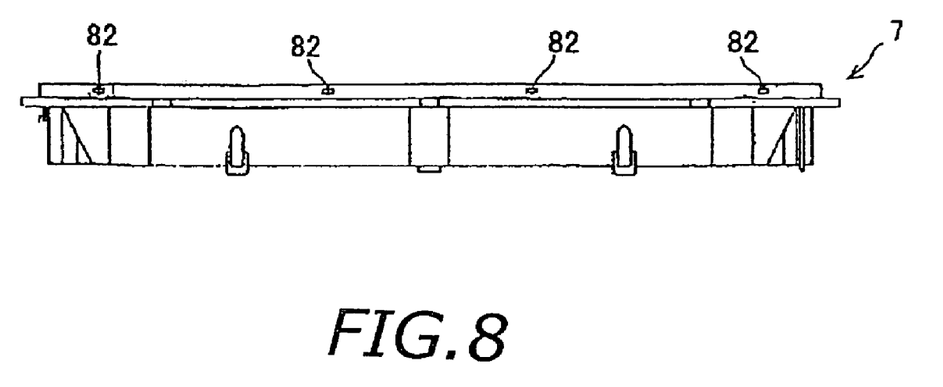
FIG. 8 is a view in the direction of the arrow VIII in FIG. 7.
Figure 9:
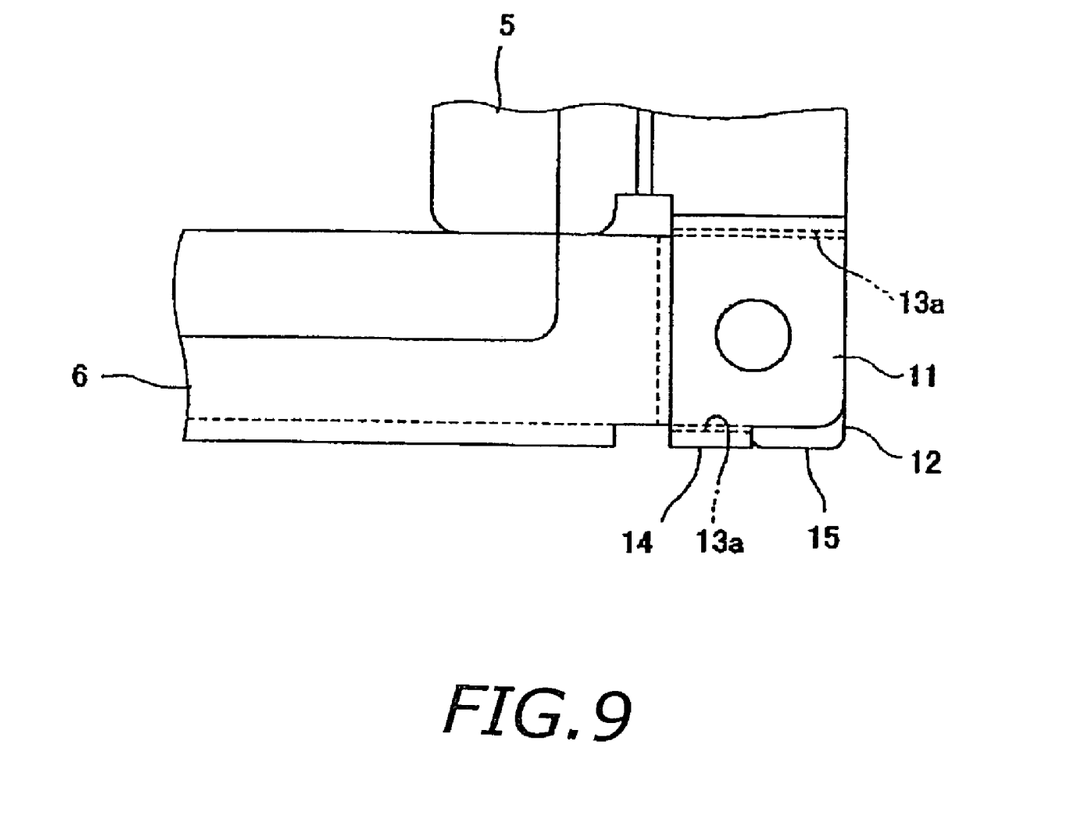
FIG. 9 is a detail view of the IV portion in FIG. 1.

FIG. 1 is a plan view of the assembled state of a bezel A pertaining to an embodiment of the present invention. FIG. 2 is a plan view of two L-shaped members 5 and 6. FIG. 3A is a detail view of the IIIA portion in FIG. 2, and FIG. 3B is a detail view of the IIIB portion in FIG. 2. FIG. 4A is a detail view of the IVA portion in FIG. 2, and FIG. 4B is a detail view of the IVB portion in FIG. 2. FIG. 5 is a view in the direction of the arrow V in FIG. 2. FIG. 6 is a view in the direction of the arrow VI in FIG. 2. FIG. 7 is a plan view of a frame 7. FIG. 8 is a view in the direction of the arrow VIII in FIG. 7. FIG. 9 is a detail view of the IV portion in FIG. 1.

As seen in FIG. 1, the bezel A is formed in the shape of a rectangular frame, and is equipped at its four corners with screw tabs 1, 2, 3, and 4 that protrude outward. This bezel A is made of metal, and fitted around the outside of a liquid crystal panel (not shown) and used to attach this liquid crystal panel by sandwiching it between itself and the frame 7 shown in FIG. 7.

As seen in FIG. 2, the bezel A is divided into a first L-shaped member 5 and a second L-shaped member 6 at two diagonal corners, and these two L-shaped members 5 and 6 are abutted together and bound, thereby constituting a rectangular frame-shaped bezel. When this bezel A is divided into the first L-shaped member 5 and the second L-shaped member 6, these can be punched out in a punching pattern in which the inside corner of one L-shaped member 5 fits up against the outside corner of the other L-shaped member 6, so there is less material loss, and the material cost is that much lower.

Each of the two L-shaped members 5 and 6 is formed such that the cross sectional shape of each side is L-shaped as shown in FIG. 9. As shown in FIGS. 3A and 3B, one of the two screw tabs 1 and 2 located in opposing directions when the two L-shaped members 5 and 6 are abutted together is formed by overlapping a lug 11 that is provided contiguously to the division end of the first L-shaped member 5 with a lug 12 that is provided contiguously to the division end of the second L-shaped member 6, and these two lugs 11 and 12 are equipped with a positioning mechanism that has the action of positioning these with respect to each other. This positioning mechanism comprises a pair of clamping faces 13a that are formed by mutually opposing groove wall faces of groove-shaped components 13 formed by bending the lug 11 on the one side at two places in the same direction, and a pair of engagement tabs 14 and 15 that engage with each other in a direction perpendicular to the clamping direction of the lug 12 on the other side by the clamping faces 13a when the lug 12 on the other side is fitted into the groove components 13 and clamped by the pair of clamping faces 13a. In the depicted examples, the engagement tab 14 on one side is formed by bending on the lug 11 on the one side, and the engagement tab 15 on the other side is formed on the lug 12 on the other side.

When the bezel A is formed by abutting the above-mentioned two L-shaped members 5 and 6 in the form of a rectangular frame, the first latching means for temporarily fixing the division ends of these L-shaped members 5 and 6 is formed by the two lugs having a positioning mechanism.

The other of the two screw tabs 1 and 2 located in opposing directions when the two L-shaped members 5 and 6 are abutted together is formed by overlapping a lug 16 that is provided contiguously to the division end of the first L-shaped member 5 with a lug 17 that is provided contiguously to the division end of the second L-shaped member 6, and these two lugs 16 and 17 are equipped with a positioning mechanism that has the action of positioning these with respect to each other. This positioning mechanism comprises a latching tab 18 formed by bending at the distal end of the lug 16 on the one side, and a latching hole 19 provided to the lug 17 on the other side, for latching the latching tab 18 in a fitted state. When the latching tab 18 is latched in the latching hole 19, the lugs 16 and 17 thereof are positioned relative to each other in two perpendicular axial directions.

As shown in FIGS. 7 and 8, the frame 7 is a rectangular resin-molded article, and is equipped with engagement protrusions 81 and 82 at a plurality of sides around the outer faces along the two long sides of this frame 7. Correspondingly, engagement holes 83 and 84 are formed as shown in FIG. 5 or 6 in the two L-shaped members 5 and 6 at a plurality of sides along the long sides of the two L-shaped members 5 and 6. The engagement protrusions 81 and 82 and the engagement holes 83 and 84 form a second latching means for temporarily fixing the two L-shaped members 5 and 6 to the frame 7.

Each of the four corners of the frame 7 is equipped with a positioning rib 71 that extends straddling the corner. These positioning ribs 71 are positioned with high precision with respect to the center of the liquid crystal panel that is attached to the frame 7. When the two L-shaped members 5 and 6 are overlapped with the frame 7, these positioning ribs 71 constitute a centering means for positioning the bezel A formed by the L-shaped members 5 and 6 with respect to the center of the liquid With the above constitution, when the liquid crystal panel is attached to the frame 7, the liquid crystal panel is placed in position on the frame 7, the two L-shaped members 5 and 6 are fitted around the outside of the liquid crystal panel so that the L-shaped members 5 and 6 are abutted together in the shape of a rectangular frame, and the corresponding lugs 16 and 17, and the corresponding lugs 11 and 12 shown in FIGS. 2 and 3 are overlapped respectively. As a result, as already described through reference to FIG. 9, the lug 12 on the other side is fitted into the groove component 13 of the lug 11 on the one side at the place where the lugs 11 and 12 overlap, and is thereby sandwiched by the pair of clamping faces 13a, and the pair of engagement tabs 14 and 15 engage with each other, which positions the lugs 11 and 12 relative to each other in two axial directions. This state is one of temporary fixing. The above also applies to the place where the lugs 16 and 17 overlap, at which the two lugs 16 and 17 are positioned relative to each other temporarily fixed as discussed above.

Also, when the two L-shaped members 5 and 6 are fitted around the outside of the liquid crystal panel and these L-shaped members 5 and 6 are abutted together in the shape of a rectangular frame, the engagement protrusions 81 and 82 on the frame 7 side are engaged in the engagement holes 83 and 84 on the side of the two L-shaped members 5 and 6, which temporarily fixes the two L-shaped members 5 and 6 to the frame 7.

Screws (not shown) are then passed through holes in the screw tabs 1, 2, 3, and 4 in the four corners of the bezel A formed by abutting the two L-shaped members 5 and 6 in the shape of a rectangular frame, and these screws are threaded into the screw holes on the frame 7 side and tightened.

When the liquid crystal panel has thus been attached to the frame 7, the inner faces of four corners of the bezel A come into contact with the positioning ribs 71 provided to the four corners of the frame 7, thereby centering the bezel A with respect to the center of the liquid crystal panel. Therefore, there are no assembly defects due to the bezel being off-center.

Also, in screwing down the screw tabs 1 to 4 of the two L-shaped members 5 and 6 fitted around the outside of the liquid crystal panel, the lugs 11 and 12 and the lugs 16 and 17 have already been temporarily fixed at the screw fastening site of the screw tab 1 formed by the lugs 11 and 12, and at the screw fastening site of the screw tab 2 formed by the lugs 16 and 17, and furthermore, the L-shaped members 5 and 6 have already been temporarily fixed to the frame 7, which means that the screw fastening operation can be carried out quickly and accurately.

As seen in FIG. 2, the bezel A is equipped with the positioning mechanism shown in FIG. 3 and the positioning mechanism shown in FIG. 4 at the two diagonal corners. Note that the bezel A may be equipped with two positioning mechanisms shown in FIG. 3 at the two diagonal corners, or may be equipped with two positioning mechanisms shown in FIG. 4 at the two diagonal corners. The modifications will be obvious to those skilled in the art from this disclosure.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Terms that are expressed as "means-plus function" in the claims should include any structure that can be utilized to carry out the function of that part of the present invention.

Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A rectangular frame-shaped bezel that is fitted around an outside of a liquid crystal panel and sandwiches the liquid crystal panel between itself and a frame, the bezel comprising:
    a pair of L-shaped members having end portions that are abutted together at two diagonal corners of the bezel;
    a pair of lugs being located at at least one of the two diagonal corners and overlapping one another to form one of screw tabs that protrudes outward of the bezel, the lugs being separately and contiguously provided to the end portions of the L-shaped members, respectively; and
    a positioning mechanism being provided to the lugs and positioning the lugs relative to each other in two axial directions that are perpendicular to one another,
    the positioning mechanism including a pair of engagement tabs that extends from the lugs, respectively, one of the engagement tabs of one of the lugs engaging with the other of the engagement tabs of the other of the lugs in one direction of the two axial directions, the one of the engagement tabs further engaging with a portion of the other of the lugs in the other direction of the two axial directions.

2. A rectangular frame-shaped bezel that is fitted around an outside of a liquid crystal panel and sandwiches the liquid crystal panel between itself and a frame, the bezel comprising:
    a pair of L-shaped members having end portions that are abutted together at two diagonal corners of the bezel;
    a pair of lugs being located at least one of the two diagonal corners and overlapping one another to form one of screw tabs that protrudes outward of the bezel, the lugs being separately and contiguously provided to the end portions of the L-shaped members, respectively; and
    a positioning mechanism being provided to the lugs and positioning the lugs relative to each other in two axial directions that are perpendicular to one another,
    the positioning mechanism including
        a pair of clamping faces that is provided to one of the lugs and clamps the other of the lugs from both sides thereof in a clamping direction; and
        a pair of engagement tabs that is separately provided to the lugs, respectively, and that engages with each other in a direction perpendicular to the clamping direction when the other of the lugs is clamped by the clamping faces of the one of the lugs.

3. The bezel according to claim 2, wherein
    the clamping faces include mutually opposing groove wall faces of groove-shaped components that are formed by bending the one of the lugs at two places in the same direction.

4. A rectangular frame-shaped bezel that is fitted around an outside of a liquid crystal panel and sandwiches the liquid crystal panel between itself and a frame, the bezel comprising:
    a pair of L-shaped members having end portions that are abutted together at two diagonal corners of the bezel;
    a pair of lugs being located at least one of the two diagonal corners and overlapping one another to form one of screw tabs that protrudes outward of the bezel, the lugs being separately and contiguously provided to the end portions of the L-shaped members, respectively; and
    a positioning mechanism being provided to the lugs and positioning the lugs relative to each other in two axial directions that are perpendicular to one another,
    the positioning mechanism including
        a latching tab that is formed by bending a distal end portion of one of the lugs; and
        a latching hole that is provided to the other of the lugs and latches the latching tab in a fitted state.

5. A rectangular frame-shaped bezel that is fitted around an outside of a liquid crystal panel and sandwiches the liquid crystal panel between itself and a frame, the bezel comprising:
    a pair of L-shaped members having end portions that are abutted together at two diagonal corners of the bezel;
    a pair of lugs being located at least one of the two diagonal corners and overlapping one another to form one of screw tabs that protrudes outward of the bezel, the lugs being separately and contiguously provided to the end portions of the L-shaped members respectively; and
    a positioning mechanism being provided to the lugs and positioning the lugs relative to each other in two axial directions that are perpendicular to one another,
    the positioning mechanism including
        a first positioning mechanism that is located on one corner of the two diagonal corners, and
        a second positioning mechanism that is located on the other corner of the two diagonal corners,
    the first positioning mechanism including
        a pair of clamping faces that is provided to one of the lugs on the one corner and clamps the other of the lugs on the one corner from both sides thereof in a clamping direction, and
        a pair of engagement tabs that is separately provided to both of the lugs on the one corner and engages with each other in a direction perpendicular to the clamping direction when the other of the lugs on the one corner is clamped by the clamping faces of the one of the lugs on the one corner;
    the second positioning mechanism including
        a latching tab that is formed by bending a distal end portion of one of the lugs on the other corner, and
        a latching hole that is provided to the other of the lugs on the other corner and latches the latching tab in a fitted state.

6. A liquid crystal module comprising:
    a frame on which a liquid crystal panel is placed;
    a rectangular frame-shaped bezel fitted around an outside of the liquid crystal panel and sandwiching the liquid crystal panel between itself and the frame, the bezel including screw tabs that protrude outward of the bezel at two diagonal corners of the bezel and a pair of L-shaped members with end portions that are abutted together at the two diagonal corners of the bezel;

a first latching section fixing the end portions of the L-shaped members temporarily when the L-shaped members are abutted together in a shape of a rectangular frame to form the bezel;

a second latching section fixing the L-shaped members to the frame temporarily;

a centering section provided to the frame, and the centering section positioning the bezel with respect to a center of the liquid crystal panel to which the bezel is fitted; and a plurality of fastening screws fixing the screw tabs to the frame.

7. The liquid crystal module according to claim 6, wherein the first latching section includes a pair of lugs that forms one of the screw tabs that is located at one of the two diagonal corners with the lugs overlapping one another, the lugs being separately and contiguously provided to the end portions of the L-shaped members; and a positioning mechanism that is provided to the lugs and positions the lugs relative to each other in two axial directions that are perpendicular to one another.

8. The liquid crystal module according to claim 7, wherein the positioning mechanism includes a pair of clamping faces that provided to one of the lugs, the clamping faces clamping the other of the lugs from both sides thereof in a clamping direction; and a pair of engagement tabs that is separately provided to the lugs, respectively, the engagement tabs engaging with each other in a direction perpendicular to the clamping direction when the other of the lugs is clamped by the clamping faces of the one of the lugs.

9. The liquid crystal module according to claim 8, wherein the clamping faces include mutually opposing groove wall faces of groove-shaped components that are formed by bending the one of the lugs at two places in the same direction.

10. The liquid crystal module according to claim 7, wherein the positioning mechanism includes a latching tab that is formed by bending a distal end portion of one of the lugs; and a latching hole that is provided to the other of the lugs and latches the latching tab in a fitted state.

11. The liquid crystal module according to claim 7, wherein the positioning mechanism includes a first positioning mechanism that is located on one corner of the two diagonal corners, and a second positioning mechanism that is located on the other corner of the two diagonal corners, the first positioning mechanism including a pair of clamping faces that is provided to one of the lugs on the one corner and clamps the other of the lugs on the one corner from both sides thereof in a clamping direction, and a pair of engagement tabs that is separately provided to both of the lugs on the one corner and engages with each other in a direction perpendicular to the clamping direction when the other of the lugs on the one corner is clamped by the clamping faces of the one of the lugs on the one corner;

the second positioning mechanism including a latching tab that is formed by bending a distal end portion of one of the lugs on the other corner, and a latching hole that is provided to the other of the lugs on the other corner and latches the latching tab in a fitted state.

12. The liquid crystal module according to claim 6, wherein the second latching section includes engagement protrusions that are provided at a plurality of locations around the frame, and engagement holes that are formed at a plurality of locations in the L-shaped members and detachably engage the engagement protrusions.

13. The liquid crystal module according to claim 6, wherein the centering section includes ribs that are provided to corners of the frame and position the L-shaped members by contacting with inner faces of inside corners of the L-shaped members.

14. A liquid crystal module comprising:

a frame on which a liquid crystal panel is placed;

a rectangular frame-shaped bezel fitted around an outside of the liquid crystal panel and sandwiching the liquid crystal panel between itself and the frame, the bezel including screw tabs that protrude outward of the bezel at each of four corners of the bezel and a pair of L-shaped members with end portions that are abutted together at two diagonal corners of the four corners of the bezel;

a first latching section fixing the end portions of the L-shaped members temporarily when the L-shaped members are abutted together in a shape of a rectangular frame to form the bezel;

a second latching section fixing the L-shaped members to the frame temporarily, and the second latching section including engagement protrusions that are provided at a plurality of locations around the frame and engagement holes that are formed at a plurality of locations in the L-shaped members and detachably engage the engagement protrusions;

a centering section including ribs that are provided to corners of the frame and position the L-shaped members by contacting with inner faces of inside corners of the L-shaped members, and the centering section positioning the bezel with respect to a center of the liquid crystal panel to which the bezel is fitted; and a plurality of fastening screws fixing the screw tabs to the frame, the first latching section including a pair of lugs that forms one of the screw tabs that is located at one of the two diagonal corners, the lugs overlapping one another, the lugs being separately and contiguously provided to the end portions of the L-shaped members, and a positioning mechanism that is provided to the lugs and positions the lugs relative to each other in two axial directions that are perpendicular to one another;

the positioning mechanism including a pair of clamping faces that is provided to one of the lugs, the clamping faces clamping the other of the lugs from both sides thereof in a clamping direction, and a pair of engagement tabs that is separately provided to the lugs, respectively, the engagement tabs engaging with each other in a direction perpendicular to the clamping direction when the other of the lugs is clamped by the clamping faces of the one of the lugs;

the clamping faces including mutually opposing groove wall faces of groove-shaped components that are formed by bending the one of the lugs at two places in the same direction.

* * * * *